(12) United States Patent
McLean et al.

(10) Patent No.: US 7,455,925 B2
(45) Date of Patent: Nov. 25, 2008

(54) THIN-LAYER FUEL CELL STRUCTURE

(75) Inventors: Gerard Francis McLean, West Vancouver (CA); Duhane Lam, Vancouver (CA); Olen Vanderleeden, Coquitlam (CA)

(73) Assignee: Angstrom Power Incorporated, North Vancouver (CA)

( * ) Notice: Subject to any disclaimer, the term of this patent is extended or adjusted under 35 U.S.C. 154(b) by 605 days.

(21) Appl. No.: 10/887,519

(22) Filed: Jul. 8, 2004

(65) Prior Publication Data

US 2006/0008682 A1 Jan. 12, 2006

(51) Int. Cl.
*H01M 8/02* (2006.01)
*H01M 8/04* (2006.01)
*H01M 4/86* (2006.01)

(52) U.S. Cl. .............................. 429/35; 429/34; 429/38; 429/40; 429/44

(58) Field of Classification Search ........................ None
See application file for complete search history.

(56) References Cited

U.S. PATENT DOCUMENTS

6,030,718 A 2/2000 Fuglevand et al. ............ 429/26
6,080,503 A 6/2000 Schmid et al. ................ 429/35
2003/0008198 A1 1/2003 Mukoyama et al. ........... 429/42
2003/0124413 A1 7/2003 Bai et al. ...................... 429/44

*Primary Examiner*—Jonathan Crepeau
(74) *Attorney, Agent, or Firm*—Schwegman, Lundberg & Woessner P.A.

(57) ABSTRACT

A fuel cell layer and methods for making a fuel cell layer comprising at least one fuel cell in communication with first reactant plenum and second reactant plenum, wherein one of the reactant plenums contains oxidant and the other reactant plenum contains fuel. The fuel cell comprises a gas barrier region formed by disposing gas barrier material on a substrate; a second region having a first port formed on the gas barrier; a first gas diffusion electrode having a first seal disposed around the electrode; an electrolyte region formed by disposing electrolyte material on the second region; a fourth region having a second port formed on the electrolyte region; a second gas diffusion electrode having a second seal disposed around the electrode, wherein the second and fourth regions are in communication with the electrolyte region, and the gas barrier region separates the first reactant plenum from the second reactant plenum.

43 Claims, 6 Drawing Sheets

THIN-LAYER FUEL CELL STRUCTURE

FIELD OF INVENTION

BRIEF DESCRIPTION OF THE DRAWINGS

The invention relates to fuel cells layers and methods of making fuel cell layers.

BACGROUND

Existing fuel cells generally are a stacked assembly of individual fuel cells, with each stack producing high current at low voltages. The typical reactor construction involves reactant distribution and current collection devices brought into contact with a layered electrochemical assembly consisting of a gas diffusion layer and a first catalyst layer. With the exception of high temperature fuel cells, such as molten carbonate cells, most proton exchange membrane, direct methanol, solid oxide or alkaline fuel cells have a layered planar structure where the layers are first formed as distinct components and then assembled into a functional fuel cell stack by placing the layers in contact with each other.

One major problem with the layered planar structure fuel cell has been that the layers must be held in intimate electrical contact with each other, which if intimate contact does not occur the internal resistance of the stack increases, which decreases the overall efficiency of the fuel cell.

A second problem with the layered planar structured fuel cell has been that with larger surface areas, problems occur to maintain consistent contact with both cooling and water removal in the inner recesses of the layered planar structured fuel cell. Also if the overall area of the cell becomes too large then there are difficulties creating the contacting forces needed to maintain the correct fluid flow distribution of reactant gases over the electrolyte surface.

Since both reactants are required to flow within the plane of the layered planar chemical reactor, at least four and up to six distinct layers have been required to form a workable cell. These layers are usually manufactured into two separate chemical reactors components. A chemical reactor stack is, then, formed by bringing layers into contact with each other. In forming the chemical reactor stack by contacting the layers, gas diffusion must be allowed within the layers to prevent gas from leaking from the assembled chemical reactor stack. The assembled stack usually has to be clamped together with significant force in order to activate perimeter seals and reduce internal contact resistance.

Electrical energy created in the fuel cell has to travel between layers of material compressed together before it can be used. These layers include membrane electrode assemblies, gas diffusion layers, separator plates, and combinations thereof. The resistance to the transfer of electrical energy through each layer and between layers also affects the performance of the fuel cell. The contact pressure and contact area that can be achieved between the layers of the fuel cell stack is directly proportional to the conductivity of these components and hence the performance of the fuel cell stacks.

Laying out layers of material and compressing them together using the brute force approach of traditional fuel cell stacks is inefficient and expensive. In addition, such designs suffer from long term performance degradation because of thermal and mechanical cycles that occur during the operation of the fuel cells.

In manufacturing fuel cell stack assemblies using this typical layering approach of all the components, accurately aligning the layers is difficult. Inaccurate alignment has a detrimental effect on the performance and durability of the fuel cell stacks.

A need has existed for micro, or small fuel cells having high volumetric power density. A need has existed for micro fuel cells capable of low cost manufacturing because of having fewer parts than the layered planar structure fuel cell. A need has existed for micro fuel cells having the ability to utilize a wide variety of electrolytes. A need has existed for a micro fuel cell, which has substantially reduced contact resistance within the fuel cell. A need has existed for a micro fuel cell, which has the ability to scale to high power density fuel cells. A need has existed for a micro fuel cell having an increased reactant surface area. A need has existed for a fuel cell capable of being scaled to micro-dimensions. A need has also existed for fuel cells capable of being connected together without the need for external components for connecting the fuel cells together.

A need has existed for a compact fuel cell with high aspect ratio cavities. The aspect ratio of the fuel cell is defined as the ratio of the fuel cell cavity height to the width. Increasing this ratio is beneficial for increasing the efficiency of the fuel cell.

A need has existed to develop fuel cells topologies or fuel cell architectures that allow increased active areas to be included in the same volume, i.e. higher density of active areas. The present embodiments meet these needs.

SUMMARY

The present invention relates to a fuel cell layer and a method for making a fuel cell layer comprising at least one fuel cell in communication with a first reactant plenum and a second reactant plenum, wherein one of the reactant plenums contains oxidant and the other reactant plenum contains fuel. The fuel cell comprises a gas barrier region from by disposing gas barrier material on a substrate; a second region having a first port formed on the gas barrier; a first gas diffusion electrode having a first seal disposed around the electrode; an electrolyte region formed by disposing electrolyte material on the second region; a fourth region having a second port formed on the electrolyte region; a second gas diffusion electrode having a second seal disposed around the electrode and wherein the second and fourth regions are in communication with the electrolyte region, the first port communications between the first reactant plenum and the first gas diffusion electrode, the second port communications between the second reactant plenum and the second gas diffusion electrode, and the gas barrier region separates the first reactant plenum from the second reactant plenum.

BRIEF DESCRIPTION OF THE FIGURES

Aspects of the present invention will be described in greater detail with reference to the appended figures.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology. Various terms as used herein are defined below. To the extent a term used in a claim is not defined below, it should be given the broadest definition persons in the pertinent art have given that term as reflected in printed publications and issued patents.

The present invention describes a thin layer fuel cell structure in which multiple unit fuel cells are formed by sequentially forming functional regions by disposition methods to build up the thin layer structure. A characteristic of the invention is that multiple materials can be used in any one layer of the fuel cell structure in order to achieve the functionality of high aspect ratio unit fuel cells with integrated sealing components. A further aspect of the invention is that high aspect ratio cavities through which fuel cell reactants must flow and diffuse are formed with low aspect ratio disposition, bonding and lamination processes thus simplifying the overall manner of construction and assembly.

The present invention also relates to a method of making a fuel cell layer.

The invention was designed to provide a single manufacturing method to create an entire fuel cell layer.

The invention was designed to create intimate interfaces between regions of a fuel cell without heat and pressure.

The invention provides a method for creation of a multi-level fuel cell structure in one smooth assembly process, without the need to assemble discrete components.

Figure 1:
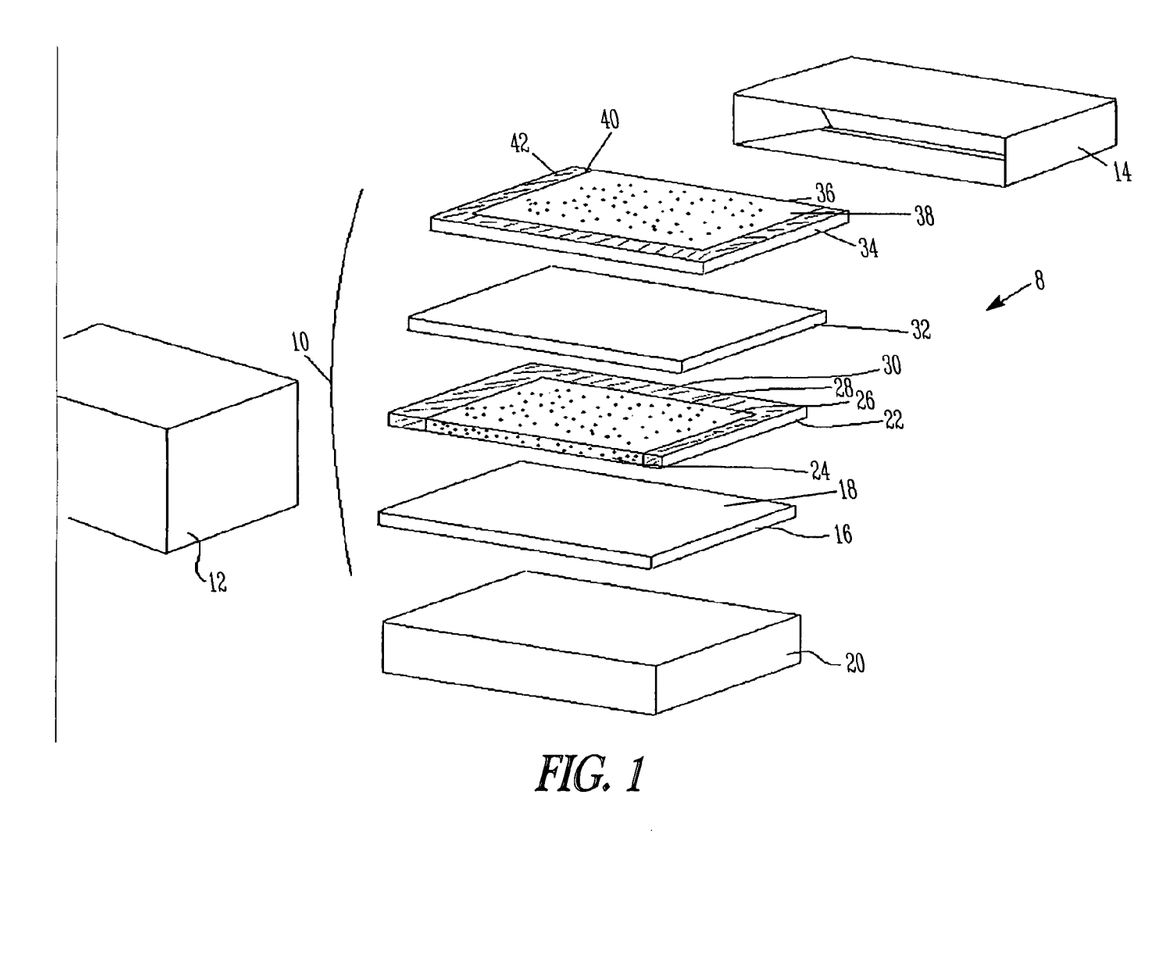
FIG. 1 is an exploded perspective view of the fuel cell used in the fuel cell layer of the invention.

The fuel cell layer (8) has at least one fuel cell (10) which connects to a first reactant plenum (12) and a second reactant plenum (14). One of the reactant plenums contains oxidant and the other reactant plenum contains fuel.

In reference to FIG. 1, an exploded view of the fuel cell (10) is made from a gas barrier region (16). This gas barrier region is preferably formed by disposing a gas barrier material (18) on a substrate (20).

The gas barrier material can be a metal, such as gold, platinum, stainless steel, niobium, copper or aluminum, a polymer composite filled with a metal, a polymer composite filled with carbon, graphite, a Mylar® containing material or a fiberglass material, for example. When the barrier is a metal, the barrier serves the additional function of providing a current path to form a series connection of adjacent fuel cells within the fuel cell layer. When the barrier is non-conductive, some alternate means of gathering electrical current from the fuel cells must be achieved. This may require forming the barrier by disposing multiple layers of different materials.

When the reactants contain a fuel and an oxidant and the gas diffusion electrodes contain catalyst then the conditions are created to sustain the generation of electrical power from the stored chemical energy in the fuel. While the figure shows four distinct regions, it should be understood that each region, while fulfilling one function within the cell may in fact be constructed from multiple materials and contain significant detailed structure. The figure shows gas diffusion electrodes, electrolytes and barriers which have high aspect ratios relative to the plenums against which these regions abut, creating complications for the fabrication of the device.

The gas barrier material (18) alternatively may contain some electrically conductive material. In general, these include metals, polymer composites filled with metal, polymer composites filled with carbon, graphite, nonmetal conductive polymers, metal plated polymers, and metalized polymers. Combinations of these materials can be used. It is contemplated that the gas barrier material can be disposed in a continuous layer or in a pattern, like a hollow square, or in a non-contiguous fashion.

The substrate (20) can be a material such as release material, such as a polyethylene or Teflon®. It can be used as part of the fuel cell, or it can be a removable substrate which can be peeled away from the gas barrier material. A ceramic or another structural support could be used as the substrate. A metallic base could also be the substrate. A functional support could be used as the substrate, such as a circuit board, or an enclosure for another electronic device.

The fuel cell layer is formed on a substrate which may be removed after fabrication is complete and is not required to be part of the final fuel cell structure. The substrate serves as a surrogate for other functional regions in the formed fuel cell layer, or as a starting point. Once the initial functional region has been disposed on the substrate there is a base for the disposition of subsequent functional regions so that the substrate (20) may be removed.

In another embodiment the substrate can be a second fuel cell or another fuel cell layer.

Figure 2:
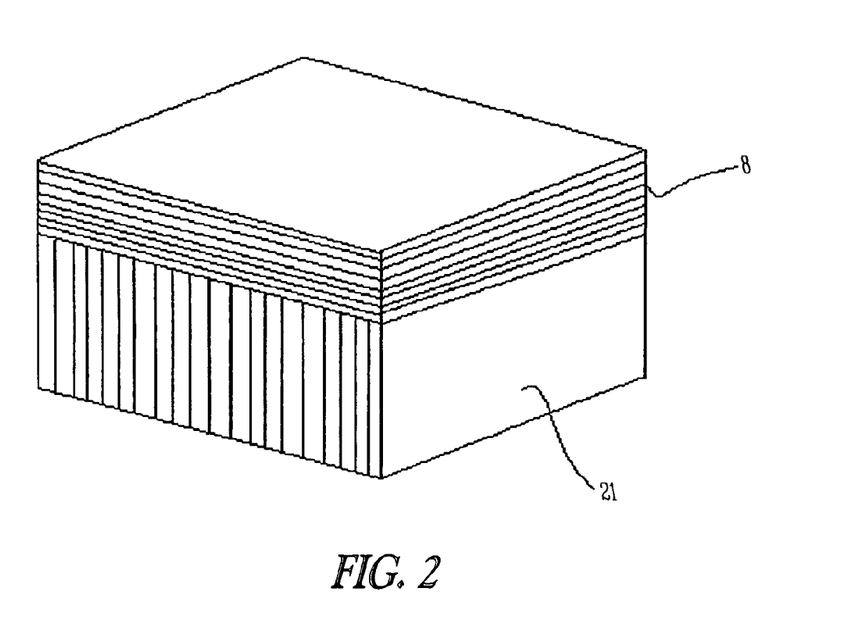
FIG. 2 is an alternative perspective view of the fuel cell layer with a second fuel cell at right angles to a first fuel cell.

FIG. 2 shows a perspective view of an alternative embodiment of the invention where the substrate is a second fuel cell layer (21) which is oriented at 90 degrees, or at right angles from the fuel cell layer (8).

Returning to FIG. 1, the fuel cell (10) has a second region (22) with a first port (24) formed in the region. This region is formed by disposing on the gas barrier region (16) a first gas diffusion electrode (26) which has a perimeter (28). This perimeter is then sealed using a seal (30). The port (24) acts as a conduit to provide communication between a reactant plenum which can contain oxidant or fuel, and the first gas diffusion electrode.

The seal (30) preferably can be an elastomer, a polymer, metal, silicone, silicon, an electrolyte, graphite, carbon, composites of these and combinations thereof.

The figure shows the seal serves to prevent the uncontrolled exchange of reactants between the first and second reactant plenums through at least one of the gas diffusion electrodes. Formation of this seal requires intimate contact between one of the gas diffusion layers and both the gas diffusion barrier and an electrolyte. In practice the formation of this seal is difficult.

In one embodiment, the first gas diffusion electrode and the first seal are disposed to form a substantially continuous layer. The first seal serves to separate the two reactant plenums so that reactant from first reactant plenum cannot pass through the first gas diffusion electrode into the second reactant plenum and vice versa. Other seals serve a similar function in the stack so that the seals work to allow reactants to enter gas diffusion electrodes while blocking the passage of reactants out of the cell into the opposing plenum.

An electrolyte region (32) is formed on the second region (22). This electrolyte region (32) is formed by disposing electrolyte material such as perfluoro-sulfonated membranes, such as Nafion®, sulfonated polyether ether ketone (PEEK), potassium hydroxide, yttria stabilized zirconium or other ion conducting electrolytic materials on the second region.

Preferably, the electrolyte is disposed in a substantially continuous layer. In one embodiment, the electrolyte is disposed to form a region that is from about 1 nanometer to about 10 millimeter thick. When the electrolyte is a Proton Exchange Membrane formed from a polymer such as Nafion®, the thickness of the electrolyte region is typically between about 1 micron and 200 microns thick.

The electrolyte could be a gel, a curable liquid, or a solid material and be usable in the scope of the invention.

It is contemplated that the electrolyte material can be disposed on the second region in a continuous layer. A composite electrolyte can be used, such as a micro-structure polymer film filled with electrolyte or a porous structure filled with electrolyte.

A fourth region (34) with a second port (36) is formed on the electrolyte region, also by disposing material on the electrolyte region which includes a second gas diffusion electrode (38) which has a second perimeter (40). A second seal (42) is disposed around the second perimeter (40). By disposing the second gas diffusion electrode (38) and second seal (42), the second port is formed. The second port acts as a conduit to provide communication between the second gas diffusion electrode and the second reactant plenum.

The fuel cell layer is constructed so that the second and fourth regions of the fuel cell are in communication with the electrolyte region, and the gas barrier region separates the first reactant plenum from the second reactant plenum.

It is contemplated that the second seal can be made of the same material as those listed for the first seal, above, or first seal can be one member of this list and the second seal can be a different member from this list.

Subsequent functional regions disposed onto the formed first fuel cell contribute to the construction of new fuel cells in the layer.

Figure 3:
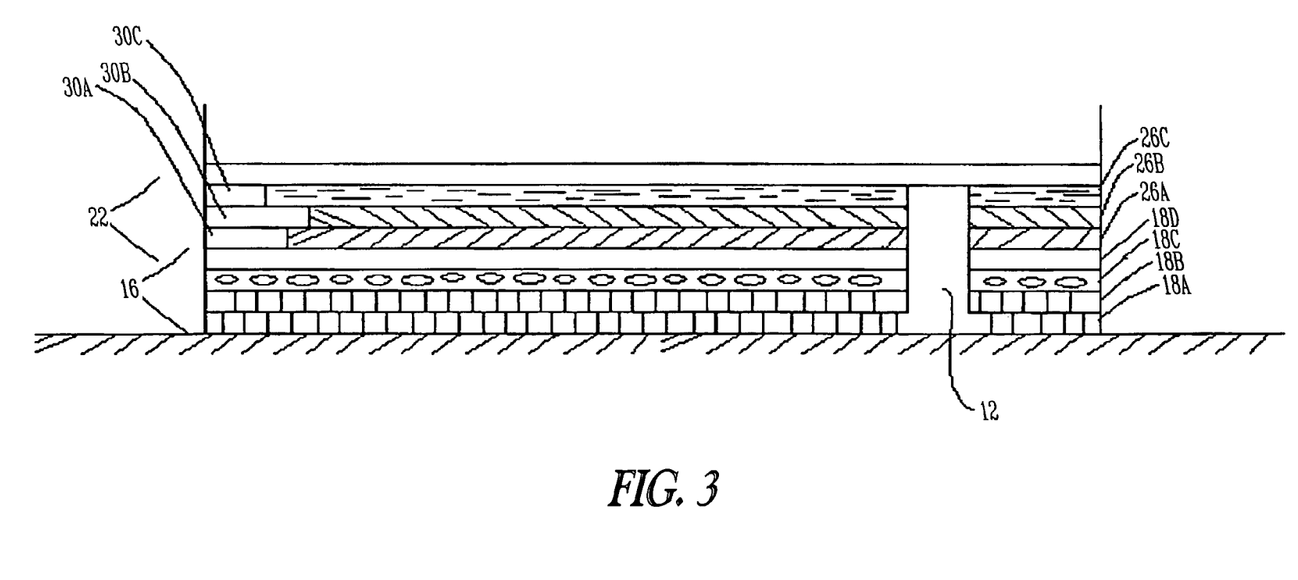
FIG. 3 is a cross sectional view of a portion of a fuel cell layer according to the invention.

FIG. 3 shows an embodiment where the gas barrier region (16) is formed from multiple dispositions of gas barrier material (18a, 18b, 18c, and 18d) on the substrate (20) and the second region (22) is formed from multiple dispositions of the first gas diffusion electrode (26a, 26b, and 26c) and multiple dispositions of first seal (30a and 30b) on the gas barrier region.

It is contemplated that the invention can have a single layer of gas barrier material (18) while having multiple layers of the first gas diffusion electrode (26) and multiple layers of the first seal (30). It is also contemplated that the fuel cell layer can use a single layer of first gas diffusion electrode and single layer of first seal with multiple layers of gas barrier material on the substrate.

In the embodiment of FIG. 3, it is contemplated that the first reactant plenum (12) is formed by creating a first continuous void space while disposing the first seal on the gas barrier region. More specifically, a "no deposit" zone is formed on the gas barrier, and as build up of the various layers occurs, a void space is formed which becomes the first reactant plenum.

The present invention describes embodiments of the thin layer fuel cell structure in which the overall high aspect ratio structure is built-up by the disposition of functional regions in a sequential manner. The formation by sequential disposition eliminates the requirement for fabrication processes that can fill high aspect ratio structures.

Figure 4:
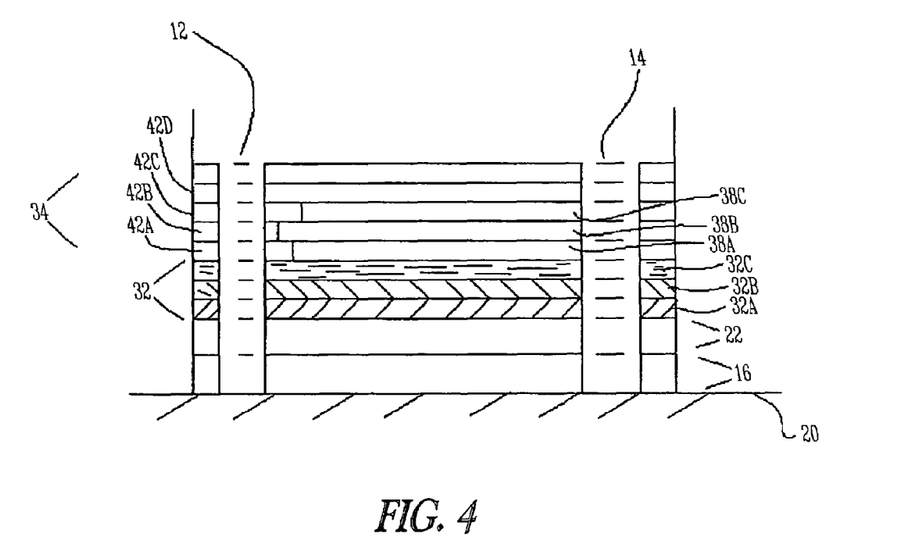
FIG. 4 is a cross sectional view of an alternative embodiment of a fuel cell layer according to this invention.

FIG. 4 shows an embodiment wherein the electrolyte region (32) is formed from multiple dispositions of electrolyte material (32a, 32b, and 32c) on the second region (22).

FIG. 4 also shows an embodiment wherein the fourth region (34) is formed from multiple dispositions of the second gas diffusion electrode (38a, 38b, and 38c) and multiple dispositions of the second seal (42a, 42b, 42c, and 42d) on the electrolyte region (32).

A second reactant plenum (14) is depicted which is formed by creating a second continuous void space while disposing the second seal layers.

Various techniques are contemplated for the disposing of the material used in the different regions. One or more of these techniques can be used for the disposing, including: printing, screen printing, ink jet printing, contact printing, offset printing, lithographic printing, and laser printing. Two other usable forms of disposition are casting and sputtering. It is possible that one portion of one region or all of one region can be formed using one of these disposition techniques, while another portion of a region, or all of a second region, can be formed using a different disposition technique.

Other disposition methods which can be used in the invention include electroplating, electrodepositing, electrophoresis, chemical vapor deposition, pulsed laser deposition, and physical vapor deposition.

Figure 5:
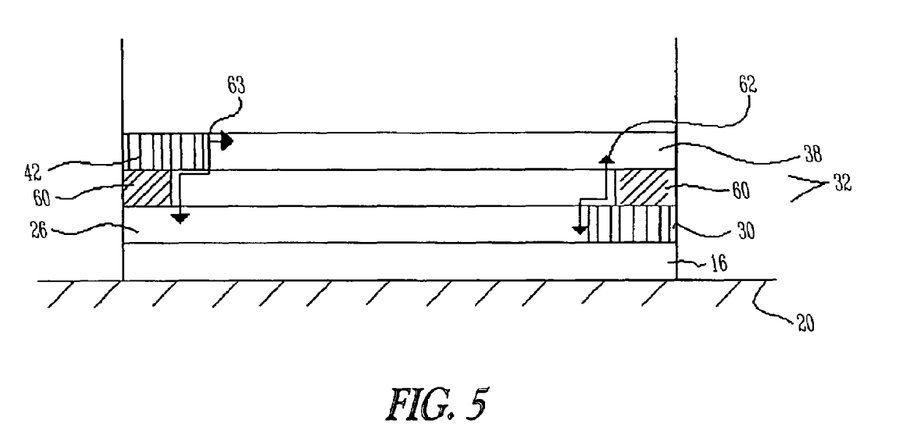
FIG. 5 is a side view of an embodiment of the invention.

FIG. 5 shows a side view of another embodiment of the invention with the electrolyte region as being sealed with a third seal (60). This third seal (60) can not only be used to go around the edges of the electrolyte as shown in this view, but portions of the electrolytic material can also be encapsulated by this seal in other embodiments.

If a third seal is used, it is preferred that the third seal (60) be spatially offset from the first and second seals, preferably forming tortuous paths (62) and (63) as shown by the arrows indicating the paths in FIG. 5.

Figure 6:
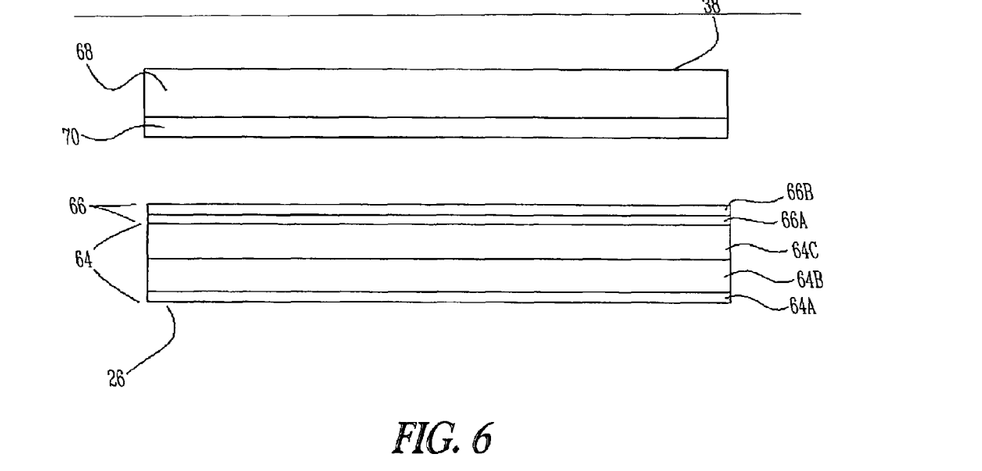
FIG. 6 is a cross sectional view of two gas diffusion electrode according to the invention.

FIG. 6 shows that the first and second gas diffusion electrodes (26 and 38) respectively, can each be made from a porous structure and a catalyst. The first gas diffusion electrode (26) is shown having porous structure (64) and catalyst (66). The second gas diffusion electrode (38) is shown having a second porous structure (68) with a second catalyst (70). Also, the first gas diffusion electrode is shown having multiple layers (64a, 64b, and 64c) of porous structure and multiple layers of catalyst (66a and 66b). Each gas diffusion electrode can have one or more porous structures. Combinations of layers are also contemplated as usable in the invention.

It is contemplated that the fuel cell uses a gas diffusion electrode where the porous structure used in one of the electrodes differs from the porous structure used in the other.

It is also contemplated that one of the gas diffusion electrodes can use a catalyst different from the other gas diffusion electrode. For example, platinum catalyst can be used in the first gas diffusion electrode and palladium catalyst can be used in the other. Catalysts that are contemplated to be usable in the invention can comprise catalysts of noble metals, alloys of noble metals and combinations thereof.

Porous structures which can be used in the gas diffusion electrode can be made of various porous materials including foams, aerogels, solgels, composites of carbon, and ionic conductors. It is also contemplated that porous structure can be created by forming a pattern of non porous material on a base, such as by printing a pattern over and over, thereby making a porous structure usable in the invention.

It is contemplated that an embodiment of the invention may have a third gas diffusion electrode is disposed on a second barrier. Additionally, a fourth seal could be disposed on this second barrier. The third gas diffusion electrode and the third seal could be disposed to form a substantially continuous layer. A second electrolyte could then be disposed on the third gas diffusion electrode and the third seal.

The relationship between the seals, the gas diffusion electrodes and the electrolyte and barrier regions is important if a sealed thin layer fuel cell is to be created. The seals must extend around the perimeter of the gas diffusion electrodes to prevent leakage of reactants into or out of the gas diffusion electrode region while impinging upon the area interfacing the electrodes to the electrolyte as little as possible in order to maximize active surface area to support the fuel cell reaction. At the same time, the seals must provide an opening to allow reactant to pass from the appropriate reactant plenum into the gas diffusion electrodes. While the design of both the materials and dimensions of the seals must accommodate this competition between objectives, an important aspect of this design is that the boundaries between seals and functional materials in any region is offset from the boundary between seals and functional materials in other regions so that a tortuous path is created at the interface between materials through different regions.

The disposing of the regions can be either by creation of a uniform dimension, that is uniform width, height, length and thickness or by varying these dimensions. In a preferred embodiment, it is contemplated that each region is disposed with a thickness from 1 nanometer to 10 millimeters. The thickness can be varied for at least one region, that is, one region may have a thinner thickness than another region. One region may have an undulating thickness that is varying from thicker to thinner and then thicker again while the other regions have constant thicknesses.

Similarly, it is contemplated that the fuel cell layer may have regions with a width between about 1 nanometer and 2 millimeters wide. As with the dimensions of thickness, it is contemplated that the width can be varied for at least one region.

As to length, this dimension can be varied as well. It is contemplated that each region or portion of a region can vary in length from about 1 micrometer to 50 centimeters.

It is important that the thickness of the electrolyte material disposed is such that the electrolyte material minimizes crossover of reactants through the electrolyte region.

Figure 7:
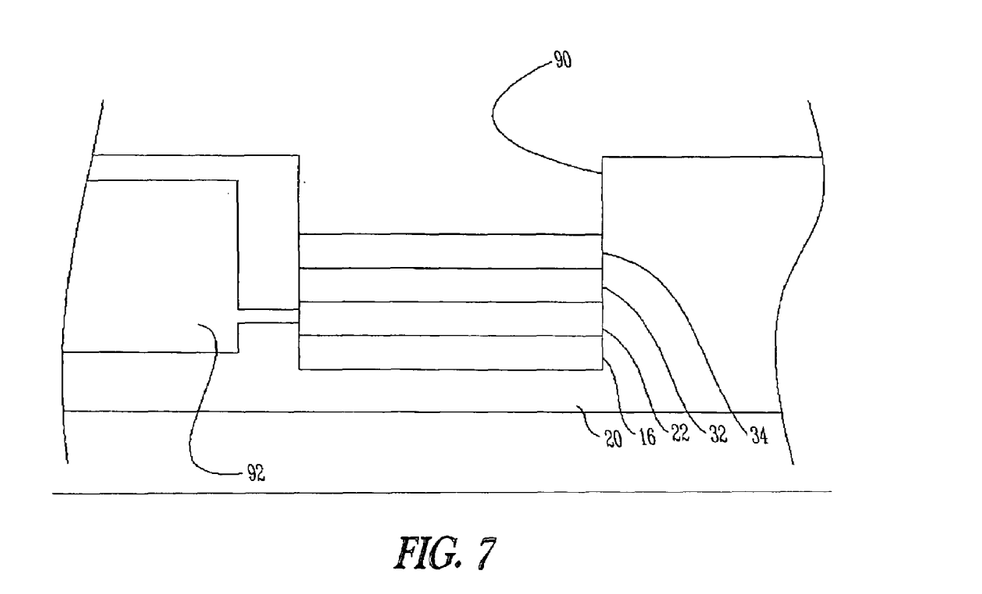
FIG. 7 is cross sectional view of a fuel cell layer of the invention formed in a channel in a substrate.

FIG. 7 shows another embodiment of the invention, where the substrate is gouged to form a channel (90) and then the four regions are shown as disposed into the channel.

It is contemplated that the channel is formed by etching, embossing, machining, ablating, cutting, burning, water jetting, or combinations of these methods.

FIG. 7 shows a reactant plenum (92) formed from a hole or continuous void created in the substrate. More than one reactant plenum can be created by this method. Both the oxidant and the fuel plenum can be formed by creating continuous void space in the substrate.

In one embodiment, the sequential disposition of functional regions is repeated until a desired number of fuel cell layers are achieved.

Further, the fuel cell layer may include an optional first reactant plenum and an optional second reactant plenum formed in sidewalls of the substrate and in gaseous communication with alternating gas diffusion electrodes in the layer. The optional first and second reactant plenums may also be formed implicitly as the functional regions are disposed by not completely filling the entire width of the channel, but rather by leaving spaces to form the first and second reactant plenums. The plenums are generally void regions configured to operate as reactant plenums that are in direct communication with the gas diffusion electrodes in the form thin layer fuel cell structure.

Alternatively, the substrate can have one or more gas delivery manifolds formed in the sidewall.

In one embodiment, the substrate is formed of porous media to facilitate the transport of reactants from a source to the side of the fuel cell layer. When the sidewalls of the channel are completely porous, seal material can be used to block the respective gas diffusion electrodes from one of the sidewalls of the channel while allowing reactant access through the other sidewall. In another embodiment, the sidewalls are selectively porous. Alternatively, the sidewalls can be solid.

The channel material could be disposed concurrently with the disposition of the functional regions. Alternately the channel could be a temporary support structure used as a fabrication tool. Alternately the channel could be formed in a substrate to facilitate the incorporation of the power source into the power consuming device. It can also be envisioned that the thin fuel cell layer could be disposed in a channel or between two substantially parallel surfaces in a continuous fashion for manufacturing.

Figure 8:
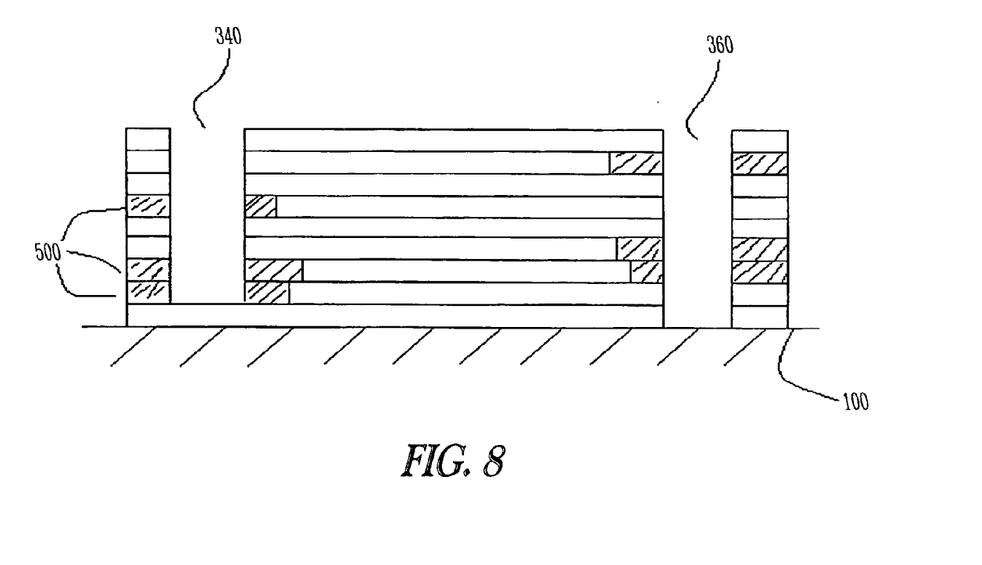
FIG. 8 is a cross sectional view of a fuel cell layer with integral reactant plenums according to the invention.

FIG. 8 illustrates a cross sectional view of a thin fuel cell layer with integral reactant distribution channels built on a planar substrate (100). The planar substrate (100) includes the stack of sequentially disposed functional regions, as described above.

Further, first and second reactant plenums (340 and 360) are built into a sealing material (500). The channels themselves can be round holes rather than long strips, and can be formed simply by momentarily suspending material delivery while disposing sealing material. The design can also be layered onto non-planar substrates.

It should be noted that the seals for the electrolyte layer could extend to the periphery of the layer to act as a reactant seal. Various combinations of seals can therefore be envisioned to create functional regions with appropriate internal barriers to prevent the unwanted flow of reactants. Additionally, it can be envisioned that the channel walls could provide the sealing function to prevent external reactant leaks or reactant leaks between adjacent functional regions. Alternately the walls of the channel could be pre-coated with a sealant material to facilitate this peripheral sealing. The electrolyte could also be used to pre-coat the channel walls, thereby providing the sealing function and providing a bonding surface for the substantially perpendicular printed electrolyte layer to bond to.

In an additional embodiment of the fuel cell layer the functional regions can be disposed directly onto the fuel supply vessel. This vessel may or may not contain a metal hydride for the storage of the fuel. In the instance that a hydride is used for fuel storage, the hydride could also be printed or layered in a similar process.

The embodiments described herein produce a fuel cell layer in which reactants enter high aspect ratio gas diffusion electrode regions. The high aspect ratio of these formed regions provides the opportunity to produce high volumetric power density fuel cells without the requirement for discrete seals, flow fields and clamps to hold the assembly together. A key aspect of the invention is that by forming the thin fuel cell layer by sequential disposition of functional regions, no high aspect ratio fabrication processes are required. In fact, the higher the aspect ratio of the functional regions of the fuel cell layer, the lower the aspect ratio of the required disposition processes. This approach creates a much lower cost fuel cell than conventionally contemplated fuel cell layers.

A further advantage of the embodiments described herein is that the entire fuel cell can be manufactured using thin layer deposition technology. This thin layer disposition technique could include, but is not limited to, ink-jet printing, chemical vapor deposition (CVD), combustion vapor deposition, sputtering, pulse-laser deposition, vacuum deposition, electrophoretic deposition, plating, pad-printing, offset-printing, spin-coating, electrostatic deposition, powder coating, painting, epitaxial growth, silk screening, lithography, contact printing, and spraying. A strength of this design is that the fuel cell functional regions are disposed in a sequential manner so at most the material forming the functional region and one sealing material need to be disposed adjacent each other within the functional region. A sealing material is usually used in conjunction with an active material such as an electrolyte material. If the fuel cell or fuel cell stack was formed by disposing materials in a direction orthogonal to the active surface direction, as conventional processes can do, several materials would need to be laid down in each successive layer.

One key innovation in the design is the off-setting of the functional regions and the overlapping of the seals within these regions. The offset design means that a good seal is only required between adjacent functional regions, and not within the functional regions themselves. If the sealant material itself prevents the unwanted transfer of reactants, then the weakness of the seal is at the interface between the seal material and the other materials disposed within the functional layer. Creating adequate seal interfaces is easier when face seals are created between the sealant material in a functional layer and the material in the adjacent functional layers. A key aspect of this design is that it creates face seals between functional regions, thus minimizing the reliance on the integrity of edge seals formed within functional regions. In addition, the dimensions of such face seals, specifically the length of the seal, can be easily controlled without impacting the aspect ratio of the formed functional regions significantly.

There are several advantages of a layered fuel cell formed using sequential disposition of functional regions. One of the key advantages is the ability to dispose very thin layers. The advantages of thin layer fuel cells include: increased volumetric power density, improved heat and mass transfer, reduced losses through reduction of conductive path lengths, and potential cost reduction from a reduction in material requirements.

Another advantage of the invention is the reduction in manufacturing steps required to assemble a fuel cell layer as compared to prior art. Cutting, trimming, bonding and similar manufacturing steps that can cause material waste and damage can be avoided.

Additionally, disposition processes such as ink jet printing allow for the disposition of complex patterns and extremely fine features without the need for masking or complex tooling. This would allow, for example, the manufacture of very narrow fuel cell layers with reduced diffusion path lengths, allowing adequate reactant access through diffusion through the porous electrode layer, eliminating the need for flow field plates in the fuel cell stack. This could also allow selective disposition of materials, for example, the disposition of catalyst materials in complex patterns representing active regions, avoiding the waste of having these materials in inactive regions. The resolution of the printing process can also be used to dispose functionally graded material, for example disposing increased catalyst loadings along flow paths to compensate for reactant dilution due to consumption, or the disposition of porous materials with controlled variations in pore size In an example of the preferred embodiment, the layers are printed using ink-jet printing. The lines of anode, electrolyte, and cathode are most preferably from about 1 micron to about 5000 microns wide, preferably from about 1 nanometer to about 10,000 microns, or from about 0.001 nanometers to about 100 millimeters.

In addition, the invention describes a method of integrating sealing materials, functional materials and complex microstructures into the functional regions; this greatly simplifies the task of forming seals and allows the creation of highly structured functional components.

When forming a fuel cell layer according to the present invention, multiple layers of materials are disposed on top of each other to create the overall repeated structure of functional regions that is shown in the Figures.

A fuel cell layer is preferably made through the sequential disposition of functional regions, starting with a barrier. There is no absolute necessity for this and the invention equally applies to fabrication sequences beginning with any of the functional regions or components thereof, so long as the final assembly incorporates fuel cells.

The invention relates to a method for making a fuel cell layer comprising at least one fuel cell having a first and second reactant plenum, wherein said method comprises the steps of: forming a gas barrier region by disposing gas barrier material on a substrate; disposing on the gas barrier, a first gas diffusion electrode having a first perimeter forming a first port for communicating between the first gas diffusion electrode and the first reactant plenum; disposing a first seal around the first perimeter; disposing on the second region electrolyte material forming an electrolyte region; disposing on the electrolyte region a second gas diffusion electrode having a second perimeter and forming a second port for communicating between the second gas diffusion electrode and the second reactant plenum; disposing a second seal around the second perimeter; enabling the second and fourth regions to communicate with the electrolyte region, and using the gas barrier region to separate the first reactant plenum from the second reactant plenum.

While the foregoing is directed to the preferred embodiments of the present invention, other and further embodiments of the invention can be devised without departing from the basic scope thereof, and the scope thereof is determined by the claims that follow.

What is claimed:

1. A fuel cell layer comprising at least one fuel cell in communication with a first reactant plenum and a second reactant plenum, wherein one of the reactant plenums contains oxidant and the other reactant plenum contains fuel, wherein said at least one fuel cell comprises:
   a gas barrier region formed by disposing gas barrier material on a substrate;
   b. a second region having a first port extending along an edge of the second region by disposing on the gas baffler:
      i. a first gas diffusion electrode having a first perimeter
      ii. a first seal at least partially disposed around the first perimeter;
         wherein said first port communicates with the first gas diffusion electrode and the first reactant plenum;
   c. an electrolyte region formed by disposing electrolyte material on the second region;
   d. a fourth region having a second port extending along an edge of the fourth region by disposing on the electrolyte region:
      i. a second gas diffusion electrode having a second perimeter;
      ii. a second seal at least partially disposed around the second perimeter, wherein said second port communicates with the second gas diffusion electrode and the second reactant plenum; and
      iii. wherein the second and fourth regions are in communication with the electrolyte region, and the gas baffler region separates the first reactant plenum from the second reactant plenum, further wherein prior to disposition on the substrate, the substrate is gouged to form a channel, and then each region is disposed into the channel.

2. The fuel cell layer of claim 1, wherein the gas barrier region is formed from multiple dispositions of gas barrier material on the substrate.

3. The fuel cell layer of claim 1, wherein the second region is formed from multiple dispositions of the first gas diffusion electrode and first seal on the gas barrier region.

4. The fuel cell layer of claim 1, wherein a reactant plenum is formed by creating a first continuous void space while disposing the first seal on the gas baffler region.

5. The fuel cell layer of claim 1, wherein the electrolyte region is formed from multiple dispositions of electrolyte material on the second region.

6. The fuel cell layer of claim 1, wherein the fourth region is formed from multiple dispositions of the second gas diffusion electrode and second seal on the electrolyte region.

7. The fuel cell layer of claim 1, wherein a reactant plenum is formed by creating a second continuous void space while disposing the second seal on the gas baffler region.

8. The fuel cell layer of claim 4, wherein the disposition of at least one of the regions is by printing.

9. The fuel cell layer of claim 8, wherein the printing is by screen printing, ink jet printing, contact printing, offset printing, lithographic printing, laser printing, and combinations thereof.

10. The fuel cell layer of claim 1, wherein the disposition of at least one of the regions is by casting.

11. The fuel cell layer of claim 1, wherein the disposition of at least one of the regions is by sputtering.

12. The fuel cell layer of claim 1, wherein the disposition of one of the regions is by a process different from the disposition used for another region.

13. The fuel cell layer of claim 1, wherein portions of a region can be disposed by different disposition methods.

14. The fuel cell of claim 13 wherein the different disposition methods comprise: printing, casting, sputtering, electroplating, electrodepositing, electrophoresis, chemical vapor deposition, pulsed laser deposition, physical vapor deposition, combustion vapor deposition, epitaxial growth, spin-coating, powder coating and combinations thereof.

15. The fuel cell layer of claim 1, wherein the disposition of one of the regions is by a method comprising: printing, casting, sputtering, electroplating, electrodepositing, electrophoresis, chemical vapor deposition, pulsed laser deposition, physical vapor deposition, combustion vapor deposition, epitaxial growth, spin-coating, powder coating and combinations thereof.

16. The fuel cell layer of claim 1, wherein the substrate is removable.

17. The fuel cell layer of claim 1, wherein the substrate is a second fuel cell.

18. The fuel cell layer of claim 1, wherein the substrate is a second fuel cell layer.

19. The fuel cell layer of claim 18, wherein the second fuel cell layer is at an orientation 90 degrees from the first fuel cell layer.

20. The fuel cell layer of claim 1, wherein the gas barrier region is electrically conductive.

21. The fuel cell layer of claim 20, wherein the gas barrier material comprises: a metal, a polymer composite filled with metal, a polymer composite filled with carbon, graphite, a nonmetal conductive polymer, a metal plated polymer, metalized polymer and combinations thereof.

22. The fuel cell layer of claim 1, wherein the gas barrier material is disposed in a continuous layer.

23. The fuel cell layer of claim 1, wherein the electrolyte material is disposed in a continuous layer.

24. The fuel cell layer of claim 1, wherein the electrolyte region further comprises a third seal disposed around the electrolytic material.

25. The fuel cell layer of claim 24, wherein the third seal is spatially offset from the first and second seal forming a tortuous path.

26. The fuel cell layer of claim 1, wherein the first seal and the second seal comprise an elastomer, a polymer, metal, silicone, silicon, an electrolyte, graphite, carbon, composites of these and combinations thereof.

27. The fuel cell layer of claim 1, wherein the first seal is of a material different from the second seal.

28. The fuel cell layer of claim 1, wherein the first and second gas diffusion electrodes each comprise a porous structure and a catalyst.

29. The fuel cell layer of claim 28, wherein at least one gas diffusion electrode can comprise multiple layers of porous structure and catalyst.

30. The fuel cell layer of claim 29, wherein at least one porous structure of the multiple layers differs from another porous structure.

31. The fuel cell layer of claim 28, wherein the porous structure of the first gas diffusion electrode is different from the porous structure of the second gas diffusion electrode.

32. The fuel cell layer of claim 28, wherein the catalyst of the first gas diffusion electrode is different from the catalyst of the second gas diffusion electrode.

33. The fuel cell layer of claim 28, wherein the porous structure is selected from the group: foam, aerogel, solgel, composites of carbon, ionic conductors, a formation of a pattern of non porous material and combinations thereof.

34. The fuel cell layer of claim 28, wherein the catalyst comprises: a noble metal, an alloy of noble metals and combinations thereof.

35. The fuel cell layer of claim 1, wherein each region is disposed in a thickness from 1 nanometer to 10 millimeters.

36. The fuel cell layer of claim 35, wherein the thickness can be varied for at least one region.

37. The fuel cell layer of claim 1, wherein each region is disposed in a width from 1 nm and 2 millimeters wide.

38. The fuel cell layer of claim 37, wherein the width can be varied for at least one region.

39. The fuel cell layer of claim 1, wherein each region is disposed in a length from 1 micrometer and 50 centimeters.

40. The fuel cell layer of claim 39, wherein the length can be varied for at least one region.

41. The fuel cell layer of claim 1, wherein the thickness of the electrolyte material minimizes crossover of reactants through the electrolyte region.

42. The fuel cell of claim 1, wherein the channel is formed by etching, embossing, machining, ablating, cutting, burning, water jetting, and combinations thereof.

43. The fuel cell layer of claim 1, wherein at least one reactant plenum is formed by creating at least one continuous void space in the substrate.

* * * * *

UNITED STATES PATENT AND TRADEMARK OFFICE
CERTIFICATE OF CORRECTION

PATENT NO. : 7,455,925 B2  Page 1 of 1
APPLICATION NO. : 10/887519
DATED : November 25, 2008
INVENTOR(S) : McLean et al.

It is certified that error appears in the above-identified patent and that said Letters Patent is hereby corrected as shown below:

In column 1, line 10, delete "BACGROUND" and insert -- BACKGROUND --, therefor.

In column 6, line 44, delete "(66aand" and insert -- (66a and --, therefor.

In column 9, line 64, after "size" insert -- . --.

In column 10, line 46, in Claim 1, before "a" insert -- a. --.

In column 10, line 49, in Claim 1, delete "baffler:" and insert -- barrier: --, therefor.

In column 11, line 1, in Claim 1, delete "baffler" and insert -- barrier --, therefor.

In column 11, line 14, in Claim 4, delete "baffler" and insert -- barrier --, therefor.

In column 11, line 23, in Claim 7, delete "baffler" and insert -- barrier --, therefor.

In column 11, line 24, in Claim 8, delete "4," and insert -- 1, --, therefor.

In column 12, line 47, in Claim 37, delete "and" and insert -- to --, therefor.

In column 12, line 51, in Claim 39, delete "and" and insert -- to --, therefor.

Signed and Sealed this

Twenty-fourth Day of February, 2009

JOHN DOLL
*Acting Director of the United States Patent and Trademark Office*